United States Patent
Lee (10) Patent No.: US 8,773,493 B2
(45) Date of Patent: *Jul. 8, 2014

(54) MOBILE COMMUNICATION TERMINAL AND METHOD FOR CONVERTING MODE OF MULTIPARTY VIDEO CALL THEREOF

(75) Inventor: Eun Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,303

(22) Filed: May 15, 2012

(65) Prior Publication Data

US 2012/0229591 A1  Sep. 13, 2012

Related U.S. Application Data

(63) Continuation of application No. 12/190,003, filed on Aug. 12, 2008, now Pat. No. 8,194,115.

(30) Foreign Application Priority Data

Aug. 29, 2007 (KR) .................. 10-2007-0087233

(51) Int. Cl.
*H04N 7/14* (2006.01)
*H04N 7/15* (2006.01)

(52) U.S. Cl.
CPC ...................................... *H04N 7/15* (2013.01)
USPC ...................................... 348/14.02; 348/14.08

(58) Field of Classification Search
USPC ........ 348/14.02, 14.07, 14.08–14.1; 709/204; 370/259, 260; 455/416, 414.1
See application file for complete search history.

(56) References Cited

U.S. PATENT DOCUMENTS 6,046,762 A    4/2000  Sonesh et al.
6,496,201 B1  12/2002  Baldwin et al.
7,404,001 B2   7/2008  Campbell et al.

FOREIGN PATENT DOCUMENTS

JP     9-331395 A     12/1997
KR  10-0713388 B1      4/2007

*Primary Examiner* — Tuan D Nguyen
(74) *Attorney, Agent, or Firm* — Birch, Stewart, Kolasch & Birch, LLP (57) ABSTRACT

A mobile communication terminal having a multiparty video call function and a method for converting a mode of a multiparty video call are disclosed. The terminal includes an input unit that receives a command for selecting one of phone call modes and a controller that displays a menu for selecting a phone call mode on the display, when a request for a video call or video chatting with the third terminal is wirelessly transmitted or received while the mobile communication terminal is performing video call communication or video chatting, and maintains an established call mode or converts the established call mode to a different phone call mode according to a phone call mode selected through the input unit to perform multiparty video call communication.

20 Claims, 4 Drawing Sheets

MOBILE COMMUNICATION TERMINAL AND METHOD FOR CONVERTING MODE OF MULTIPARTY VIDEO CALL THEREOF

CROSS REFERENCE TO RELATED APPLICATIONS

This application is a Continuation of application Ser. No. 12/190,003 filed on Aug. 12, 2008 now U.S. Pat. No. 8,194,115, which claims priority to Application No. 10-2007-0087233 filed in the Republic of Korea on Aug. 29, 2007. The entire contents of all of the above applications are hereby incorporated by reference.

BACKGROUND OF THE INVENTION

1. Field of the Invention

This document relates to a mobile communication terminal providing a multiparty video call function and a method for converting a mode of a multiparty video call.

2. Discussion of the Related Art

In the current mobile communication technologies, video calls are typically implemented in two modes: one-to-one (point-to-point) video call and one-to-many (point-to-multipoint) video conferencing.

In video conferencing, other people than a host are participating in the video conference in the form of a video call, not strictly in the form of video conference in its literal meaning. Without receiving an invitation from the host, people cannot participate in the video conversation, so it is difficult to implement the video conference as an actual face-to-face conference.

Meanwhile, during the one-to-one video call communication, it is not possible to receive voice (audio signal) or a video call of a third party. Namely, the current video call techniques have a limitation in that when a video call mode is selected and a call is originated in the selected mode, the video call is unconditionally maintained only in the selected video call mode and cannot be converted into a different video call mode until when the corresponding call is released.

SUMMARY OF THE INVENTION

An aspect of this document is to provide a mobile communication terminal and computer program product that implements a multiparty video call function and a method for converting (changing) a mode of a multiparty video call.

In one aspect, a mobile communication terminal having a multiparty video call function comprises: a display unit that displays a second image received from a second terminal or a third image received from a third terminal via a wireless communication module and displays a menu for selecting a phone call mode; and an input unit that receives a command for selecting one of phone call modes.

The mobile communication terminal further comprises: a controller that displays a menu for selecting a phone call mode on the display unit when a request for a video call or video chatting with the third terminal is transmitted or received while the mobile communication terminal is performing video call communication or video chatting, and maintains an established call mode or converts the established call mode into a different phone call mode according to a phone call mode selected via the input unit to thus perform multiparty video call communication.

The controller may transmit the menu for selecting a phone call mode to the third terminal via the communication module.

The phone call mode may comprise at least one of a first phone call mode in which the video call or video chatting with the second terminal is put on hold and a video call or video chatting with the third terminal is additionally established, and a second phone call mode in which the video call or the video chatting is simultaneously established between the second terminal and the third terminal.

Converting into the second phone call mode may refer to converting from a one-to-one video call mode or a one-to-one video chatting mode with the second terminal into a multiparty video call mode or a multiparty video chatting mode in which the second terminal and the third terminal are simultaneously connected.

When the mobile communication terminal is converted into the second phone call mode, the controller may divide a screen to display the third image and the second image such that they do not overlap, and when the second image or the third image is selected, the controller may display on the display unit a menu for selecting a phone call mode desired to be converted in connection with a terminal of the selected image.

When the mobile communication terminal is converted into the first phone call mode, the controller may display only the third image or divide the screen to display the third image and the second image such that they do not overlap. When the second image or the third image is selected, the controller may display on the display unit the menu for selecting a phone call mode desired to be converted in connection with a terminal of the selected image, and establish a video call or video chatting with the terminal of the selected image while putting on hold the video call or video chatting established with the other remaining terminal.

When the mobile communication is converted into the first phone call mode, the third image and the second image may be discriminately displayed by a tap or an icon. The tap or the icon may be discriminately displayed by at least one of the phone call modes and user information of each terminal. When one of the tap and the icon is selected, only a corresponding image may be displayed and the controller may establish a video call or video chatting with a terminal of the corresponding image and put the video call or video chatting with the other remaining terminal on hold.

In another aspect, a computer program product and a method for converting a mode of a multiparty video call of a mobile communication terminal, comprises: wirelessly transmitting/receiving a request for a video call or video chatting with a third terminal while performing video call communication or video chatting with a second terminal; displaying a screen image for selecting one of phone call modes when a video call is established; selecting a phone call mode via an input unit; and converting the mobile communication terminal into the selected phone call mode to perform multiparty video call communication.

When the request for the video call or video chatting is wirelessly transmitted or received, the mobile communication terminal may be automatically converted into a pre-set phone call mode to perform the multiparty video call communication.

The method for converting a mode of a multiparty video call of the mobile communication terminal may further comprise: converting the mobile communication terminal into a different phone call mode during the multiparty video call communication.

The method for converting a mode of a multiparty video call of the mobile communication terminal may further comprise: wirelessly transmitting a phone call mode conversion message to a terminal that has not transmitted or received a request for a video call, before the mobile communication terminal is converted into the selected phone call mode, and the message may comprise the selected phone call mode and information on the user of the third terminal.

BRIEF DESCRIPTION OF THE DRAWINGS

The implementation of this document will be described in detail with reference to the following drawings in which like numerals refer to like elements.

DETAILED DESCRIPTION OF THE INVENTION

The foregoing and other objects, features, aspects and advantages of the present invention will become more apparent from the following detailed description of the present invention when taken in conjunction with the accompanying drawings. The same reference numerals denote the same elements throughout the specification. In describing the present invention, if a detailed explanation for a related known function or construction is considered to unnecessarily divert the gist of the present invention, such explanation will be omitted but would be understood by those skilled in the art.

Figure 1:
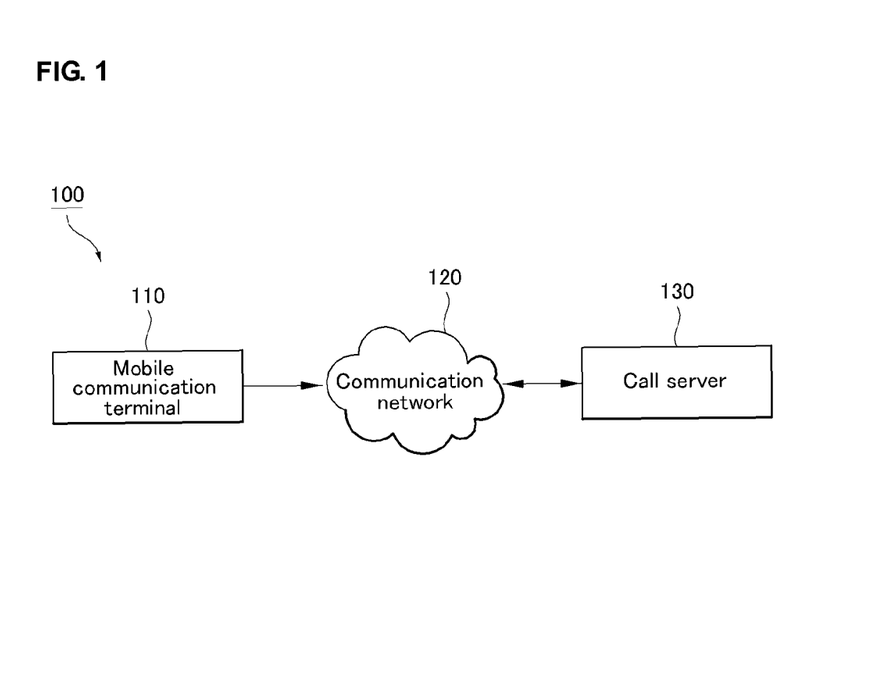
FIG. 1 is a schematic view illustrating an environment for multiparty video call communication according to an embodiment of the present invention.

FIG. 1 is a schematic view illustrating a multiparty video call environment according to an embodiment of the present invention.

With reference to FIG. 1, a multiparty video call environment 100 may comprise a mobile communication terminal 110, a communication network 120, and a call server 130.

The mobile communication terminal 110 according to the present invention may comprise various mobile terminals such as PDAs (Personal Digital Assistants), mobile phones, and the like.

The communication network 120 may comprise a circuit switching network comprising a fixed line telephone network such as a PSTN (Public Switched Telephone Network) and a mobile communication network such as a PLMN (Public Land Mobile Network). Also, the communication network 120 may comprise a packet switching network such as a PDSN (Public Switching Data Network) that may interwork with a data network such as an IP (Internet Protocol) network comprising a fixed line Internet and the wireless Internet. In addition, the communication network 120 may comprise various systems such as a router for interfacing various signals comprising an audio signal and a multimedia data packet, an MSC (Mobile Switching Center), and a base station, etc.

Accordingly, the communication network 120 may provide not only a communication path for performing voice call communications with a third terminal but also a VoIP (Voice over Internet Protocol), a video call service, an instant message service, and various session-based multimedia services, etc., via an IP-based network in conformity with next-generation mobile communication standards such as 3GPP. In addition, the communication network 120 may provide a connection path allowing the mobile communication terminal 110 to be connected with various call servers 130 therethrough so as to be provided with diverse services, and a communication path allowing data transmission and reception between the mobile communication terminal 110 and a connected call server 130.

When call connection is established between or among two or more parties, the call server 130 may transmit information about the user of the mobile communication terminal 110 and another party (or other parties) participating in the multiparty call communications to the user of the mobile communication terminal 110 and the other parties.

Figure 2:
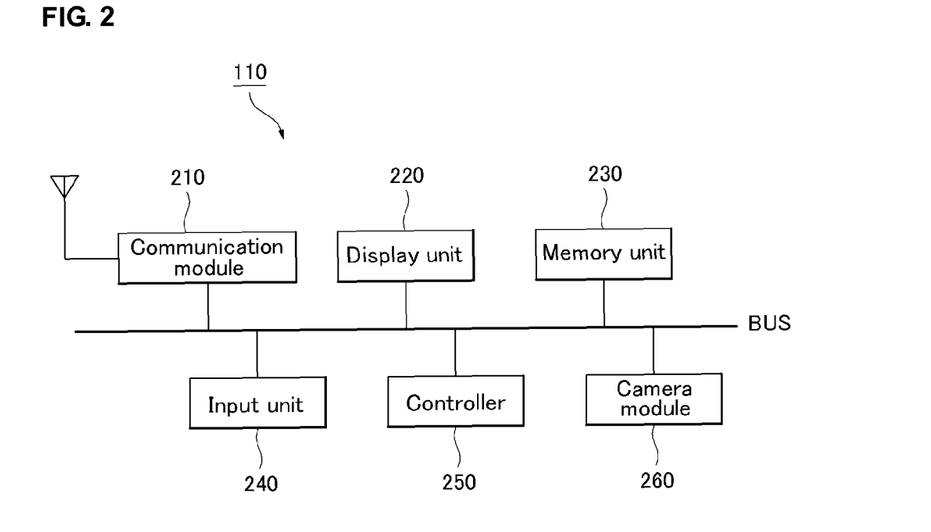
FIG. 2 is a schematic block diagram showing the configuration of a mobile communication terminal according to the embodiment of the present invention.

FIG. 2 is a schematic block diagram showing the configuration of a mobile communication terminal 110 according to the embodiment of the present invention.

The mobile communication terminal 110 according to the embodiment of the present invention may comprise a communication module 210, a display unit 220, a memory unit 230, an input unit 240, a controller 250, and a camera module 260.

The respective elements may be connected by a bus, but without being limited thereto, some or the entirety of the elements may be connected by respective dedicated lines.

The communication module 210 is a wireless communication unit that transmits and receives audio and packet data to and from the communication network 120. The communication module 210 is requisite for implementing a communication function such as audio/video communications and message transmission and reception, etc.

The display unit 220 may display a state of the mobile communication terminal 110 or various pieces of information according to a control signal outputted from the controller 250. The display unit 220 may display an image received from a terminal of another party (i.e., a second terminal) or an image received from a terminal of yet another party (a third terminal) through the communication module 210 and a menu for selecting a phone call mode. The phone call mode will be described later.

The memory unit 230 may comprise a non-volatile memory that stores programs and data required for performing various functions provided by the mobile communication terminal 110 and volatile memory that temporarily stores various data generated according to operations of the mobile communication terminal 110.

The input unit 240 may receive various information or commands from the user and may be implemented as a keypad having various numeric keys, direction keys and function keys or a touch screen. The input unit 240 may receive a command for selecting one of phone call modes.

The controller 250 may be implemented as a processor. The controller 250 controls general operations of the mobile communication terminal 110 and the operations of the elements of the mobile communication terminal 110. In addition, in a state that the mobile communication terminal 110 is performing a video call or video chatting with the second terminal, when a request for a video call or video chatting with a third terminal is transmitted or received, the controller 250 may display a menu for selecting a phone call mode on the display unit 220 and maintain the established phone call mode or converts the mobile communication terminal 110 to a different phone call mode according to a phone call mode selected through the input unit 240 to perform multi-party video communications.

The camera module 260 may be implemented with a digital still video camera as a basic component that can capture a still image or video, and comprise a lens (not shown), an image pickup device such as a CCD (Charge Coupled Device) (not shown), and a camera body (not shown) in which components of the camera module 260 are mounted. The camera module 260 may comprise a plurality of camera units.

Figure 3:
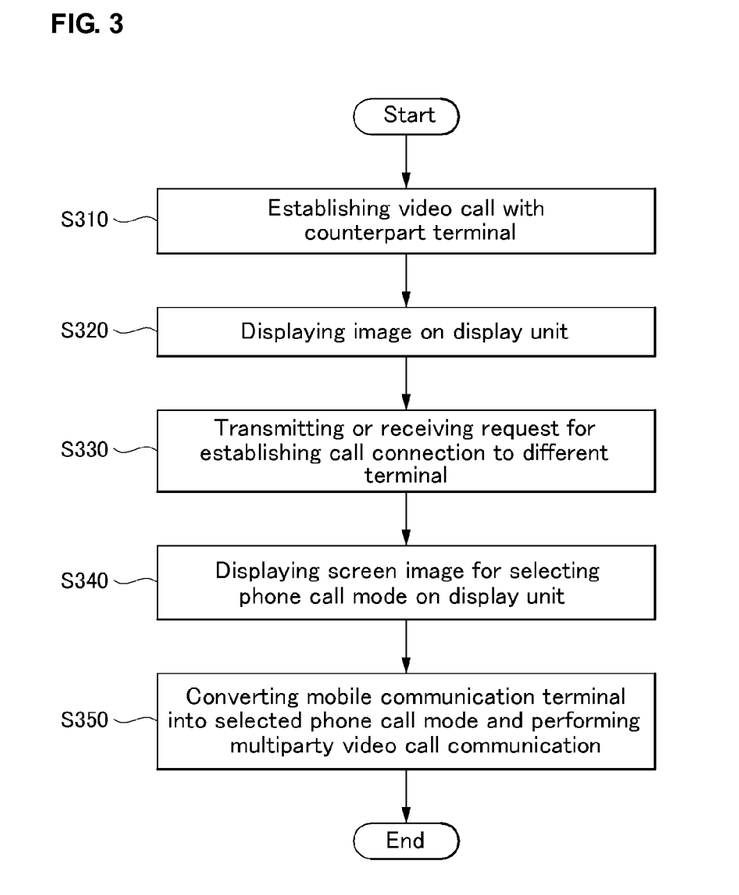
FIG. 3 is a flow chart illustrating the process of a method for converting a mode of a multiparty video call of the mobile communication terminal according to the embodiment of the present invention.

FIG. 3 is a flow chart illustrating the process of a method for converting a mode of a multiparty video call of the mobile communication terminal according to the embodiment of the present invention.

Figure 4:
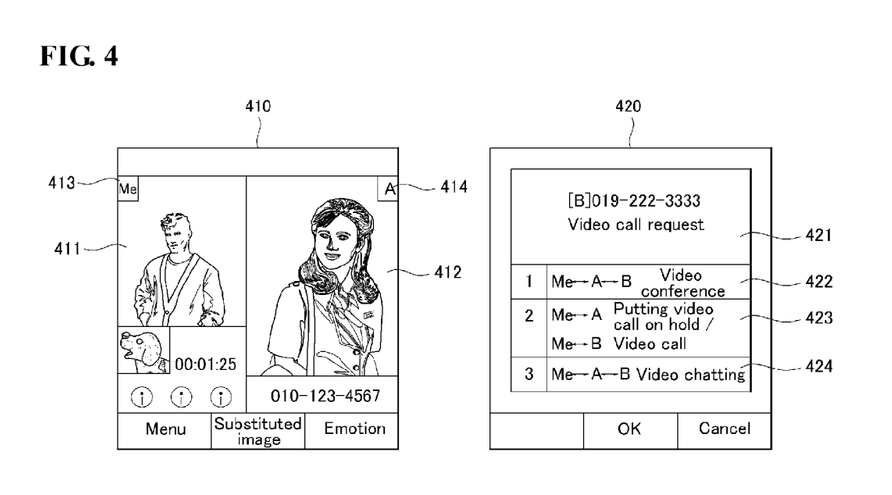
FIG. 4 is a view illustrating one example of screen images for receiving a request for establishing a video call from a third terminal during a video call according to the embodiment of the present invention.

FIG. 4 is a view illustrating one example of screen images for receiving a request for establishing a video call from a third terminal during the video call according to the embodiment of the present invention.

Figure 5:
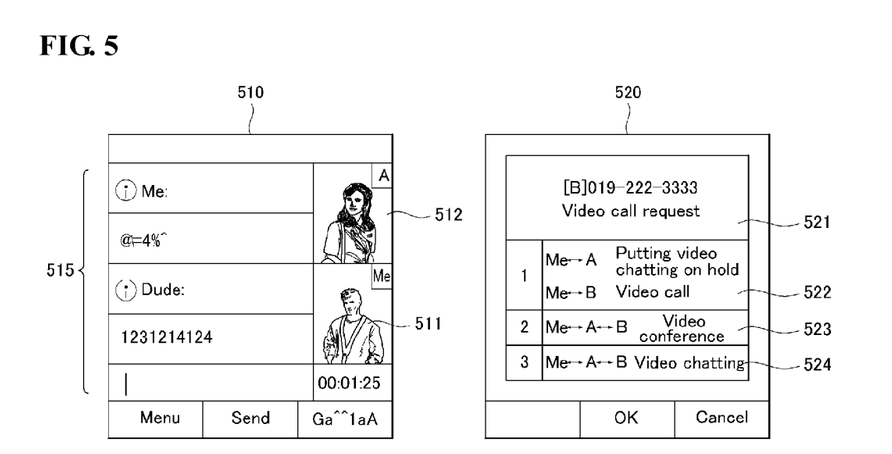
FIG. 5 is a view illustrating one example of screen images for receiving a request for establishing to a video call from the third terminal during video chatting according to the embodiment of the present invention.

FIG. 5 is a view illustrating one example of screen images for receiving a request for establishing a video call from the third terminal during video chatting according to the embodiment of the present invention.

The method for converting a mode of a multiparty video call will now be described with reference to FIGS. 3 to 5.

With reference to FIG. 3, when a video call (or video chatting) is established between the mobile communication terminal 110 and the second terminal, the mobile communication terminal 110 performs a video call through a high speed packet data service (S310). Namely, the controller 250 of the user terminal 110 may process an image captured by the camera module 260, a voice inputted through a speaker (not shown), and/or text or image inputted through the input unit 240, or process an image, voice, and/or text received from the second terminal.

As the video call is established between the user terminal 110 and the second terminal, the controller 250 of the user terminal 110 may process an image of the user (referred to as 'a first image', hereinafter) acquired through the camera module 260 and an image of another party (referred to as 'a second image', hereinafter), which has been transmitted by the second terminal and received by the user terminal 110 through the communication module 210 and display the first and second images on the display unit 220 (S320).

Regarding a screen image 410 in FIG. 4, when the video call is established between the user terminal 110 and the second terminal, the controller 250 may display on the display unit 220 a first image 411 and a second image 412 along with identification marks 413 and 414 that discriminately identify the first and second images 411 and 412. In this case, only the second image 412 may be displayed on the display unit 220 according to a user selection.

Regarding a screen image 510 in FIG. 5, when the mobile communication terminal is converted into the one-to-one video chatting mode in the state that the video call has been established between the user terminal 110 and the second terminal, the controller 250 may display on the display unit 220 a chatting window 515 comprising an input window for inputting text data and an output window for sequentially displaying inputted text data and received text data, as well as the first and second images 511 and 512.

During the video call or video chatting between the user terminal 110 and the second terminal, when a request for a video call or video chatting is transmitted to or received from a third terminal (S330), the controller 250 displays a screen image for selecting a phone call mode on the display unit 220 of the user terminal 110 (S340). In addition, the controller 250 may transmit a menu for selecting a phone call mode to the third terminal through the communication module 210 according to a user selection. When the user terminal 110 or the third terminal selects a phone call mode, the controller 250 converts the user terminal 110 to the selected phone call mode to perform a multiparty video call (S350).

Also, in this case, the controller 250 may transmit a phone call mode conversion message informing that the phone call mode of the user terminal 110 has been converted, to the second terminal with which the user terminal 110 has been connected for the video call. In this case, the message may comprise detailed information of the selected phone call mode, information about the user of the third terminal to which the establishment of the video call or the video chatting has been requested.

The phone call mode may comprise a first phone call mode in which the video call or video chatting with the second terminal is put on hold and a video call or video chatting is additionally established with the third terminal, and a second phone call mode in which a video call or video chatting is simultaneously established among the three parties; the user terminal, the second terminal, and the third terminal.

The first phone call mode may be classified into a video call mode (referred to as 'a first video call mode', hereinafter) in which the established video call or video chatting with the second terminal is temporarily put on hold and the user terminal 110 is additionally connected with the third terminal to or from which the request for establishing a video call has been transmitted or received, and a video chatting mode (referred to as 'a first video chatting mode', hereinafter) in which the established video call or video chatting with the second terminal is temporarily put on hold and the user terminal 110 is newly connected with the third terminal to or from which the request for establishing video chatting has been transmitted or received.

The second phone call mode may be classified into a video call mode (referred to as 'a second video call mode', hereinafter) in which the user terminal 110, the second terminal, and the terminal which has requested establishment of a video call are simultaneously connected, and a video chatting mode (referred to as 'a second video chatting mode', hereinafter) in which the user terminal, the second terminal, and the third terminal which has requested establishment of video chatting are simultaneously connected.

If the call connection with the second terminal is not temporarily put on hold but completely cut off, for example, if the second terminal terminates its call connection upon receiving the phone call mode conversion message, the video call is performed only between the user terminal 110 and the third terminal in the one-to-one video call mode or in one-to-one video chatting mode.

Regarding a screen image 420 in FIG. 4, when the second video call mode 422 is selected from a phone call mode select screen image 421, the previously established one-to-one video call mode between the user terminal 110 and the second terminal is converted into the video call mode in which the user terminal 110, the second terminal, and the third terminal which has requested establishment of a video call are all simultaneously connected. Accordingly, the three parties are connected to conduct video communications.

If a first video call mode 423 is selected from the select screen image 421, the previously established one-to-one video call between the user terminal 110 and the second terminal is temporarily put on hold and the user terminal 110 and the third terminal which has requested establishment the video call are connected to perform a one-to-one video call.

When a second video chatting mode 424 is selected, the user terminal 110, the second terminal, and the third terminal which has requested the establishment of the video call may be all simultaneously connected to perform video chatting.

Although not shown, for example, when a request for establishment of video chatting is received from the third terminal and the first video chatting mode is selected, the previously established one-to-one video call between the user terminal 110 and the second terminal is temporarily put on hold, and the user terminal 110 and the third terminal that has requested the establishment of video chatting are connected to perform video chatting in the one-to-one manner.

Meanwhile, with reference to FIG. 5, if a request for establishment of a video call is received from the third terminal while the user terminal 110 and the second terminal are performing video chatting, likewise as in the case where establishment of the video call is requested by the third terminal during the established video call between the user terminal 110 and the second terminal, the controller 250 may display the screen image for selecting a phone call mode on the display unit 220 of the user terminal 110.

For example, when establishment of a video call is requested by the third terminal while the user terminal 110 and the second terminal perform video chatting, similarly to the case where the video call is requested by the third terminal while the user terminal 110 and the second terminal perform the video call as shown in FIG. 4, the first video call mode 522, a second video call mode 523, a first video chatting mode 524, and a second video chatting mode (not shown) may be executed.

In a different embodiment of the present invention, the user may previously set a phone call mode by manipulating the input unit 240 before receiving the request for establishment of the video call or the video chatting from the third terminal. Accordingly, the user terminal 110 may be automatically converted into the pre-set phone call mode upon receiving the request for establishment of the video call or the video chatting.

In a still different embodiment of the present invention, when the user terminal 110 requests establishment of a video call or video chatting from the third terminal, while performing the video call or video chatting with the second terminal, the screen image for selecting a phone call mode may be displayed on the display unit 220 of the user terminal 110 and the user may select a phone call mode.

Figure 6:
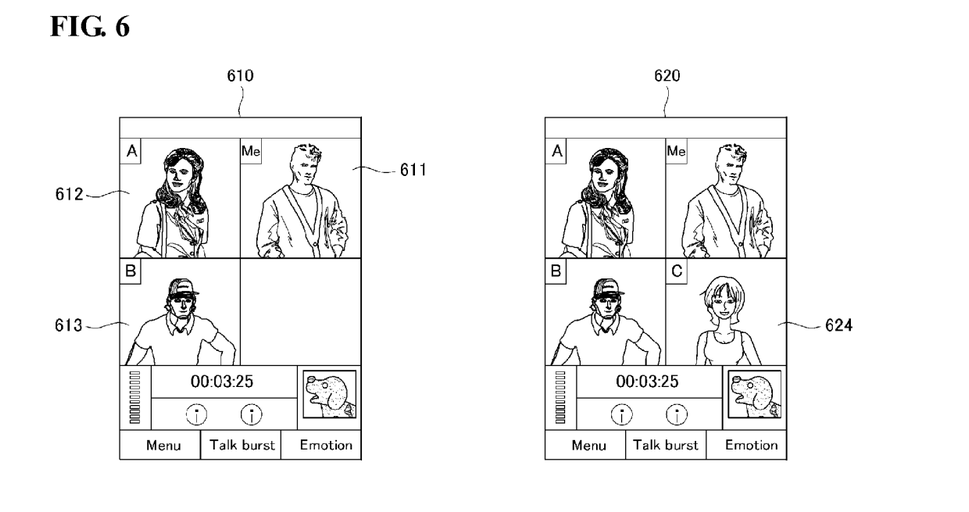
FIG. 6 is a view for explaining a second phone call mode according to the embodiment of the present invention.

FIG. 6 is a view for explaining a second phone call mode according to the embodiment of the present invention When the user terminal 110 is converted into the second video call mode according to a user selection, the controller 250 may display screen images 610 and 620 as shown in FIG. 6 on the display unit 220 of the user terminal 110. The screen image 610 may be displayed when three terminals including the user terminal perform video call or video chatting, and the screen image 620 may be displayed when four terminals including the user terminal 110 perform video call or video chatting.

Regarding the screen image 610, the controller 250 may display a first image 611, a second image 612, and an image 613 (referred to as 'a third image', hereinafter) of the third terminal which has transmitted or received a request for establishment of the video call or the video chatting. The controller 250 may display only the second and third images 612 and 613, excluding the first image 611, according to a user selection.

In this case, the controller 250 may divide the screen to display the third and second images such that they do not overlap with each other.

When the second or the third image is selected, the controller 250 may display on the display unit 220 the menu for selecting a phone call mode to be converted (i.e., to which the user terminal 110 may be converted) in connection with a terminal of the selected image.

For example, as for the screen image 610 in FIG. 6, when the user wants to convert the video call with the third terminal into a different phone call mode in the second video call mode, he may select the third image 613 through a key input or a touch input. Then, the menu for selecting a phone call mode may be displayed on the display unit 220 and the user may select a phone call mode, i.e., the video chatting mode, desired to be converted in connection with the third terminal, thus converting the phone call mode to the selected phone call mode.

In addition, both the second image 612 and the third image 613 may be selected and the current second video call mode may be converted into the second video chatting mode, in connection with both the second terminal and the third terminal.

The screen image 620 in FIG. 6 additionally includes an image 624 of a still third terminal when the still third terminal participates in the video call communication among the three parties during the second video call mode, so the video call is performed among the four parties.

Figure 7:
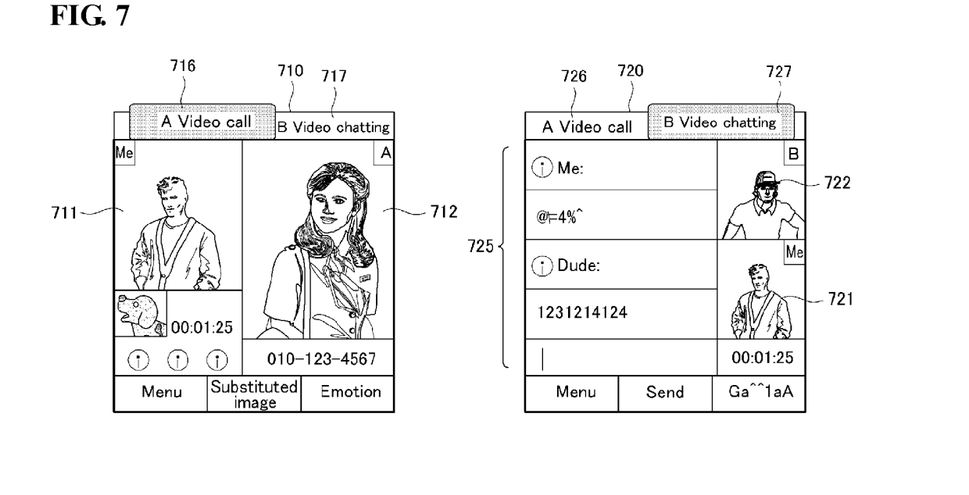
FIG. 7 is a view for explaining a first phone call mode according to the embodiment of the present invention.

FIG. 7 is a view for explaining a first phone call mode according to the embodiment of the present invention.

A screen image 710 is displayed when the third terminal (A) requests a video call and the user terminal 110 selects the first video call mode while performing video chatting with the second terminal (B).

When the third terminal (A) requests the video call while the user terminal 110 is performing video chatting with the second terminal (B) and if the user terminal 110 selects the first phone call mode, the established one-to-one video chatting between the user terminal 110 and the second terminal (B) is temporarily put on hold and the user terminal 110 and the third terminal (A), which has requested establishment of a video call, are connected to perform video call communication in a one-to-one manner.

Accordingly, the controller 250 may deactivate the screen image of the video chatting with the second terminal (B) and activate a video call screen image with the third terminal (A). In this case, like the screen image 710 as shown in FIG. 7, the controller 250 may display only the video call screen image with the third terminal (A) in the active state as an entire screen image on the display unit 220 according to a user selection.

In this case, like the screen image 710 as shown in FIG. 7, the video call screen image with the third terminal (A) in the active state may comprise a first image 711 and a third image 712, and in this case, only the third image 712 may be displayed as a video call screen image entirely on the display unit 220 according to a user selection.

Because the video chatting screen image with the second terminal (B) is deactivated, it is not displayed on the display unit 220. The video chatting screen image with the second terminal (B) may comprise the first and second images, and the video chatting screen image with the second terminal (B) may be configured only by the second image according to a user selection.

When the video call screen image with the third terminal (A) is configured only by the third image 712 according to a user selection and the video chatting screen image with the second terminal (B) is configured only by the second image, the controller 250 may divide the screen such that the second and third images do not overlap thereon to display both the second and third images entirely on the display unit 220.

In this case, when the second image or third image is selected, the controller 250 may display on the display unit 220 the menu for selecting a phone call mode desired to be converted in connection with a terminal of the selected image.

For example, regarding the screen image 710 in FIG. 7, when the user wants to convert into a different phone call mode during the video call mode in connection with the third terminal (A), he may select the third image 712 through a key input or a touch input. Then, the menu for selecting a phone call mode may be displayed on the display unit 220 and the user may convert the current phone call mode to the one-to-one video chatting mode in connection with the third terminal (A).

Alternatively, the user may also select the second image (not shown) of the second terminal (B) as well as the third image of the third terminal (A) to convert the user terminal 110 into the second phone call mode.

The screen image 720 in FIG. 7 is displayed when the third terminal (B) requests the video call while the user terminal 110 is performing video call communication with the second terminal (A), and the user terminal 110 selects the first video chatting mode.

That is, when the third terminal (B) requests the video call while the user terminal 110 is performing video call communication with the second terminal (A) and if the user terminal 110 selects the first video chatting mode, the previously established one-to-one video call between the user terminal 110 and the second terminal (A) is temporarily put on hold and the user terminal 110 and the third terminal (B) which has requested the establishment of the video call are connected to perform video chatting in a one-to-one manner.

Accordingly, the video call screen image with the second terminal (A) is deactivated and a video chatting screen image with the third terminal (B) is activated. In this case, like the screen image 720 in FIG. 7, only the video chatting screen image with the third terminal (B) in the active state may be entirely displayed on the display unit 220.

The video chatting screen image with the activated third terminal (B) may comprise a first image 721, a third image 722, and a chatting window 725. The video chatting screen image with the third terminal (B) may be configured only by the third image 722 according to a user selection. The video call screen image with the deactivated second terminal (A) is not currently displayed on the display unit 220 and comprises the first and second images. Alternatively, the video call screen image with the second terminal (A) may be configured only by the second image according to a user selection.

If the video call screen image with the second terminal (A) is configured only by the second image (not shown) and the video chatting screen image with the third terminal (B) is configured only by the third image 722 according to a user selection, the controller 250 may divide the screen such that the second and third images do not overlap to display both the second and third images entirely on the display unit 220.

In this case, when the second or third image is selected, the controller 250 may display on the display unit 220 the menu for selecting a phone call mode to be converted in connection with a terminal of the selected image.

For example, regarding the screen image 720 in FIG. 7, if the user wants to convert the user terminal 110 into a different phone call mode in the video chatting mode in connection with the third terminal (B), he may select the third image 722 through a key input or a touch input. Then, the menu for selecting a phone call mode may be displayed on the display unit 220 and the user may select the one-to-one video call mode to convert the phone call mode in connection with the third terminal (B).

Alternatively, the user may also select the second image (not shown) of the second terminal (A) as well as the third image to convert the user terminal 110 into the second video call mode or the second video chatting mode.

Regarding the screen images 710 and 720 in FIG. 7, the video call screen image with the second terminal (A) and the video chatting screen image with the third terminal (B) may be discriminated by, for example, identification marks such as taps 716, 717, 726, and 727 in their display.

In another embodiment, with the user terminal 110 performing multiparty video call communication in the first phone call mode, upon selecting the tap 717 or another icon (not shown) indicating the video chatting screen image with the deactivated second terminal (B) in the screen image 710 in FIG. 7, the controller 250 may put the one-to-one video call with the activated third terminal (A) on hold and activate one-to-one video chatting with the second terminal (B) in the inactive state. In this case, only an image associated with the one-to-one video chatting with the activated second terminal (B) may be displayed entirely on the display unit 220. Namely, the screen image configuration for video call communication such as the screen image 710 in FIG. 7 displayed on the display unit 220 may be converted into the screen image configuration for the video chatting such as the screen image 720 displayed on the display unit 220, and vice versa.

In a different embodiment of the present invention, the method for converting a mode of a multiparty video call involving three terminals (three parties) as described above may be applicable to a multiparty video call involving four or more terminals (four or more parties), in a similar manner.

As described above, because the mobile communication terminal can be freely converted from the one-to-one video call to one-to-many (multiparty) video call, user convenience can be enhanced.

In addition, in converting into the multiparty video call, the phone call mode with the participants can be individually or collectively selected or converted, and a user interface is provided to allow the user to select a desired individual or a desired phone call mode to perform a call with each participant, so the phone call mode can be freely converted.

In the embodiments described above, audible announcements may be played to announce to a user the name of a party attempting to join, or joining, and established video call.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile terminal having a multiparty video call function, comprising:
    a camera;
    a communication module;
    a display unit; and
    a controller configured to:
        perform a first video call with a second terminal, the first video call including displaying a first image acquired via the camera and a second image received from the second terminal while transmitting and receiving data for the first video call;
        transmit or receive a request for a second video call with at least one third terminal;
        convert a one-to-one video call into a multiparty video call in which communication among the mobile terminal, the second terminal and the at least one third terminal is performed;
        display the first image, the second image and at least one third image corresponding to the at least one third terminal; and
        provide at least one chatting window for transmitting and receiving a text message from and to at least one of the second terminal and the at least one third terminal via the at least one chatting window.

2. The mobile terminal of claim 1, wherein the controller is further configured to display the first image, the second image and the at least one third image such that they do not overlap.

3. The mobile terminal of claim 1, wherein the first image, the second image and the at least one third image are discriminately distinguished by a displayed identification mark.

4. The mobile terminal of claim 3, wherein the identification mark includes terminal user information.

5. The mobile terminal of claim 1, wherein at least one of the first video call and the second video call is converted to video chatting in response to a touch input on the display unit.

6. The mobile terminal of claim 5, wherein the controller is further configured to provide a menu for selecting one of a video call or a video chatting, when the second image or third image is selected.

7. The mobile terminal of claim 6, wherein the controller is further configured to:
    deactivate the video call and activate the video chatting if the menu corresponding to the video chatting is selected.

8. The mobile terminal of claim 1, wherein the controller is further configured to display the chatting window when the multiparty video call is converted to a multiparty video chatting.

9. The mobile terminal of claim 1, wherein the controller is further configured to output audible announcements to announce to a user attempting to join or joining of a party to an established video call.

10. The mobile terminal of claim 1, wherein the controller is further configured to:
    activate a third image corresponding to a third terminal participated in the second video call; and
    display the third image entirely on the display unit after the activation.

11. A method for performing a multiparty video call in a mobile terminal, the method comprising:
    performing a first video call with a second terminal, the first video call including displaying, via a display unit of the mobile terminal, a first image acquired via a camera of the mobile terminal and a second image received from the second terminal while transmitting and receiving data for the first video call;
    while performing the first video call, transmitting or receiving a request for a second video call with at least one third terminal via a communication module of the mobile terminal;
    converting a one-to-one video call into a multiparty video call in which communication among the mobile terminal, the second terminal and the at least one third terminal is performed;
    displaying, via the display unit, the first image, the second image and at least one third image corresponding to the at least one third terminal; and
    displaying at least one chatting window for transmitting and receiving a text message from and to at least one of the second terminal and the at least one third terminal via the at least one chatting window.

12. The method of claim 11, wherein the first image, the second image and the at least one third image are displayed such that they do not overlap.

13. The method of claim 11, wherein the first image, the second image and the at least one third image are discriminately distinguished by a displayed identification mark.

14. The method of claim 13, wherein the identification mark includes terminal user information.

15. The method of claim 11, wherein at least one of the first video call and the second video call is converted to video chatting in response to a touch input on the display unit.

16. The method of claim 15, further comprising:
    providing a menu for selecting one of a video call or a video chatting, when the second image or third image is selected.

17. The method of claim 16, further comprising:
    deactivating the video call and activating the video chatting if the menu corresponding to the video chatting is selected.

18. The method of claim 11, further comprising:
    displaying the chatting window when the multiparty video call is converted to a multiparty video chatting.

19. The method of claim 11, further comprising:
    outputting audible announcements to announce to a user attempting to join or jointing of a party to an established video call.

20. The method of claim 11, further comprising:
    activating a third image corresponding to a third terminal participated in the second video call; and
    displaying the third image entirely on the display unit after the activation.

* * * * *